United States Patent
Zhou et al.

(10) Patent No.: US 10,014,768 B2
(45) Date of Patent: Jul. 3, 2018

(54) CHARGE PUMP VOLTAGE REGULATOR

(71) Applicants: Semiconductor Manufacturing International (Shanghai) Corporation, Shaghai (CN); Semiconductor Manufacturing International (Beijing) Corporation, Beijing (CN)

(72) Inventors: Yao Zhou, Shanghai (CN); Hao Ni, Shanghai (CN); Tian Shen Tang, Shanghai (CN)

(73) Assignees: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

( * ) Notice: Subject to any disclaimer, the term of this patent is extended or adjusted under 35 U.S.C. 154(b) by 0 days.

(21) Appl. No.: 15/435,519

(22) Filed: Feb. 17, 2017

(65) Prior Publication Data
US 2017/0288532 A1    Oct. 5, 2017

(30) Foreign Application Priority Data
Mar. 30, 2016   (CN) .......................... 2016 1 0192253

(51) Int. Cl.
*H02M 3/07*  (2006.01)
*H02M 1/08*  (2006.01)
*H02M 1/00*  (2006.01)

(52) U.S. Cl.
CPC ............... *H02M 3/07* (2013.01); *H02M 1/08* (2013.01); *H02M 2001/0048* (2013.01)

(58) Field of Classification Search
None
See application file for complete search history.

(56) References Cited

U.S. PATENT DOCUMENTS 6,259,612 B1    7/2001  Itoh
6,486,727 B1 *  11/2002 Kwong ................. H02M 3/073
                                                        327/156
(Continued)

FOREIGN PATENT DOCUMENTS

CN          103389771 A       11/2013
WO       WO 2016030962 A1 *   3/2016  ............... G05F 1/56

OTHER PUBLICATIONS

The European Patent Office (EPO) The Extended European Search Report for 17162501.5 dated Jul. 27, 2017 8 Pages.

*Primary Examiner* — Jeffrey Gblende
(74) *Attorney, Agent, or Firm* — Anova Law Group, PLLC

(57) ABSTRACT

A charge pump voltage regulator is provided. The charge pump voltage regulator includes a charge pump circuit, where an output terminal of the charge pump circuit outputs a stable voltage. The charge pump voltage regulator also includes a voltage divider circuit suitable to divide the stable voltage to output a divided voltage and a clock oscillator providing a drive clock signal for the charge pump circuit. In addition, the charge pump voltage regulator includes a first voltage comparator circuit suitable to output at least one of a first comparison result and a second comparison result. Further, the charge pump voltage regulator includes a logic control unit, where, when the charge pump voltage regulator operates in a standby mode, the logic control unit outputs a first control level to the clock oscillator according to the at least one of the first comparison result and the second comparison result.

19 Claims, 3 Drawing Sheets

(56) References Cited

U.S. PATENT DOCUMENTS

| | | | |
|---|---|---|---|
| 2008/0024096 A1 | 1/2008 | Pan | |
| 2008/0055991 A1* | 3/2008 | Kim | G11C 16/0483 |
| | | | 365/185.11 |
| 2010/0244791 A1* | 9/2010 | Nirschl | G11O 5/147 |
| | | | 323/282 |
| 2012/0268179 A1* | 10/2012 | Sung | H02M 3/07 |
| | | | 327/157 |
| 2013/0229226 A1* | 9/2013 | Chiu | H02M 3/07 |
| | | | 327/536 |
| 2015/0236584 A1* | 8/2015 | Pelley | H02M 3/07 |
| | | | 327/536 |
| 2016/0233770 A1* | 8/2016 | Arakawa | H02M 3/158 |

* cited by examiner

CHARGE PUMP VOLTAGE REGULATOR

CROSS-REFERENCES TO RELATED APPLICATIONS

This application claims the priority of Chinese patent application No. 201610192253.2, filed on Mar. 30, 2016, the entirety of which is incorporated herein by reference.

FIELD OF THE INVENTION

The present invention generally relates to the field of semiconductor technology and, more particularly, relates to a charge pump voltage regulator.

BACKGROUND

With development of electronic information technology, low-power design and application of memory products play an important role in electronic systems. A charge pump is a type of switched capacitor voltage converter. Its conversion efficiency is high and its peripheral circuits are simple, therefore it has been widely used in modern power management circuits. The charge pump is suitable for memory, networking equipment and portable applications.

The charge pump is also called a switched capacitor voltage converter, and includes a reference circuit, a comparator circuit, a converter circuit, and a control circuit. A switch array, an oscillator, a logic circuit, and the comparator circuit are configured to rise voltage. A capacitor is configured to store energy. The charge pump may apply a mechanism of pulse-frequency modulation and, only when charges must be transferred out to maintain output regulation, the charges are generated. When the output voltage of the charge pump is higher than the target regulation voltage, the charge pump operates in a standby mode, in which the current consumption is minimal because the charges stored in the output capacitor can provide the load current. With continuous discharge of the output capacitor, the output voltage is gradually reduced to the target regulation voltage and, then, the charge pump can enter an active mode and transfer the charges to the output terminal. The charges are supplied to the load current, and increase the voltage of the output capacitor.

FIG. 1 is a schematic diagram of an existing charge pump voltage regulator. As shown in FIG. 1, the existing charge pump voltage regulator 100 includes a charge pump circuit 101, a resistor voltage divider circuit 102, and a voltage comparator 103. An output terminal of the charge pump circuit 101 is connected to an output terminal of the charge pump voltage regulator 100 and outputs a signal $V_{out}$. The resistor voltage divider circuit is suitable to divide the signal $V_{out}$ and outputs a divided voltage $V_{div}$. A first input terminal and a second input terminal of the voltage comparator 103 respectively input a reference voltage $V_{ref}$ and the divided voltage $V_{div}$. The comparison result outputted from the voltage comparator 103 can be configured to control a clock oscillator (not labeled) to output a drive clock signal CLK, to drive the charge pump circuit 101.

Using a memory integrated with the charge pump voltage regulator 100 as an example, the memory can control the charge pump voltage regulator 100 to operate in the standby mode and the active mode. Referring to FIG. 1 and FIG. 2, $V_s$ is a target voltage outputted from the charge pump voltage regulator 100. When the signal $V_{out}$ is larger than the target voltage $V_s$, the signal $V_{out}$ is dropped and the charge pump circuit 101 operates in the standby mode. When the signal $V_{out}$ is smaller than the target voltage $V_s$, the signal $V_{out}$ is raised and the charge pump circuit 101 operates in the active mode. The rise or drop of the signal $V_{out}$ depends on the comparison result with the reference voltage $V_{ref}$. The logic level indicated by different comparison results outputted from the voltage comparator 103 is identified by the logic circuit (not labeled), to control the clock oscillator to output the drive clock signal CLK. In the existing charge pump voltage regulator 100, the charge pump circuit 101 is turned on frequently. In addition, the resistor voltage divider circuit 102 is configured to divide the signal $V_{out}$, such that, in the standby mode, the current in the output terminal of the charge pump voltage regulator 100 is large.

Therefore, the charge pump voltage regulator 100 formed by existing techniques fires an issue of large standby power consumption. The disclosed device structures and methods are directed to solve one or more problems set forth above and other problems.

BRIEF SUMMARY OF THE DISCLOSURE

One aspect of the present disclosure includes a charge pump voltage regulator. The charge pump voltage regulator includes a charge pump circuit, wherein an output terminal of the charge pump circuit is connected to an output terminal of the charge pump voltage regulator and outputs a stable voltage. The charge pump voltage regulator also includes a voltage divider circuit suitable to divide the stable voltage to output a divided voltage and a clock oscillator providing a drive clock signal for the charge pump circuit. In addition, the charge pump voltage regulator includes a first voltage comparator circuit, wherein a first input terminal and a second input terminal of the first voltage comparator circuit respectively input a reference voltage and the divided voltage, and the first voltage comparator circuit is suitable to output at least one of a first comparison result and a second comparison result. Further, the charge pump voltage regulator includes a logic control unit, wherein, when the charge pump voltage regulator operates in a standby mode, the logic control unit outputs a first control level to the clock oscillator according to the at least one of the first comparison result and the second comparison result.

Another aspect of the present disclosure includes a method for driving a charge pump voltage regulator. The method includes providing a charge pump circuit, wherein an output terminal of the charge pump circuit is connected to an output terminal of the charge pump voltage regulator and outputs a stable voltage. The method also includes providing a voltage divider circuit suitable to divide the stable voltage to output a divided voltage, and providing a clock oscillator providing a drive clock signal for the charge pump circuit. Moreover, the method includes providing a first voltage comparator circuit, wherein a first input terminal and a second input terminal of the first voltage comparator circuit respectively input a reference voltage and the divided voltage, and the first voltage comparator circuit is suitable to output at least one of a first comparison result and a second comparison result. In addition, the method includes providing a logic control unit, wherein, when the charge pump voltage regulator operates in a standby mode, the logic control unit outputs a first control level to the clock oscillator according to the at least one of the tint comparison result and the second comparison result. Further, the method includes making at least one of the first comparison result and the second comparison result be reversed when the charge pump voltage regulator operates in a standby mode, and the stable voltage is smaller than a lower limit value and larger than an upper limit value; and making at least one of the first comparison result and the second comparison result remain unchanged when the stable voltage is in a voltage range from the lower limit value to the upper limit value.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or the alike parts.

Figure 1:
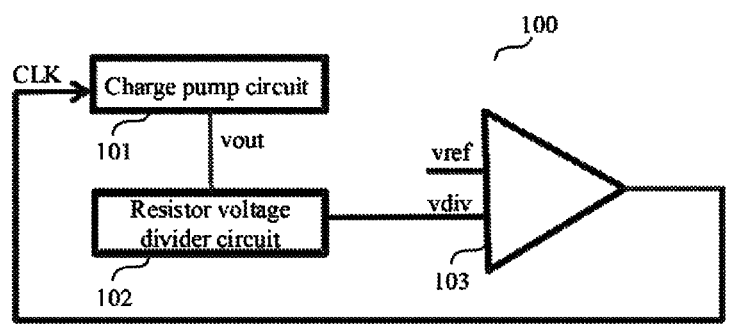
FIG. 1 illustrates a schematic diagram of an existing charge pump voltage regulator.
Figure 2:
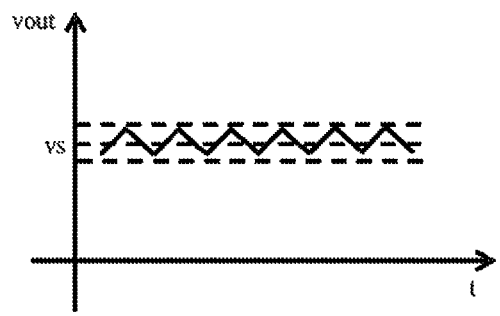
FIG. 2 illustrates a waveform diagram of a signal $V_{out}$ outputted from an existing charge pump voltage regulator shown in FIG. 1.
Figure 3:
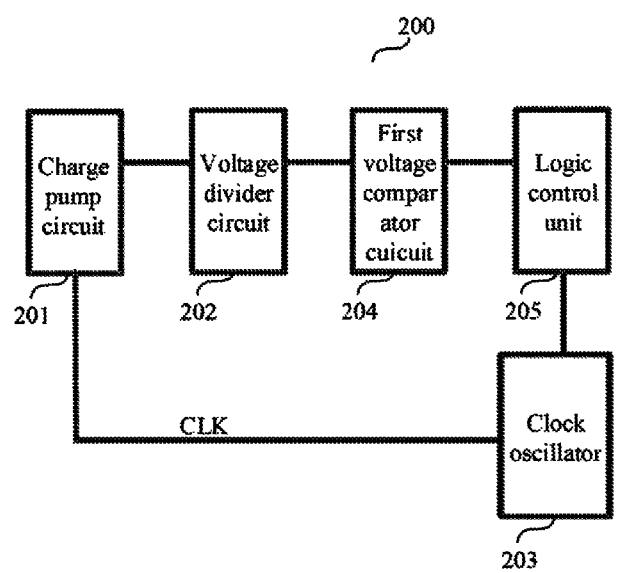
FIG. 3 illustrates a schematic diagram of a charge pump voltage regulator consistent with the disclosed embodiments.

FIG. 3 illustrates a schematic diagram of a charge pump voltage regulator consistent with the disclosed embodiments.

As shown in FIG. 3, a charge pump voltage regulator 200 may include a charge pump circuit 201. The charge pump circuit 201 may be a DC-DC converter circuit, and its output terminal may be connected to the output terminal of the charge pump voltage regulator 200, and may output a stable voltage $V_{out}$. The stable voltage $V_{out}$ may be a rising-edge or falling-edge voltage pulse, and may supply power to external loads.

The charge pump voltage regulator 200 may also include a voltage divider circuit 202 and a clock oscillator 203. The voltage divider circuit 202 may be suitable to divide the stable voltage $V_{out}$, and may output a divided voltage $V_{div}$. The clock oscillator 203 may be suitable to provide a drive clock signal CLK for the charge pump circuit 201, to control operation states of the charge pump circuit 201. When the clock oscillator 203 outputs the drive clock signal CLK, a switched capacitor inside the charge pump circuit 201 may be charging, such that the stable $V_{out}$ voltage may rise. When the clock oscillator 203 stops outputting the drive clock signal CLK, the switched capacitor inside the charge pump circuit 201 may be discharging, such that the stable voltage $V_{out}$ may fall.

Further, the charge pump voltage regulator 200 may include a first voltage comparator circuit 204 and a logic control unit 205. A first input terminal and a second input terminal of the first voltage comparator circuit 204 may respectively input a reference voltage $V_{ref}$ and the divided voltage $V_{div}$, and the first voltage comparator circuit 204 may be suitable to output a first comparison result (result 1) and a second comparison result (result 2). If the charge pump voltage regulator 200 operates in the standby mode, the logic control unit 205 may be suitable to output a first control level (con 1) to the clock oscillator 203 according to the first comparison result (result 1) and/or the second comparison result (result 2).

When the first comparison result (result 1) and/or the second comparison result (result 2) indicate that the stable voltage $V_{out}$ is smaller than a lower limit value $V_L$, the first, control level (con 1) outputted from the logic control unit 205 may control the clock oscillator 203 to output the drive clock signal CLK. When the first comparison result (result 1) and/or the second comparison result (result 2) indicate that the stable voltage $V_{out}$ is larger than an upper limit value $V_H$, the first control level (con 1) outputted from the logic control unit 205 may control the clock oscillator 203 to stop outputting the drive clock signal CLK. The lower limit value $V_L$ may be smaller than the upper limit value $V_H$.

In one embodiment, the first comparison result (result 1) and/or the second comparison result (result 2) outputted from the first voltage comparator circuit 204 may be reversed when the stable voltage $V_{out}$ is smaller than the lower limit value $V_L$ and the stable voltage $V_{out}$ is larger than the upper limit value $V_H$.

Figure 4:
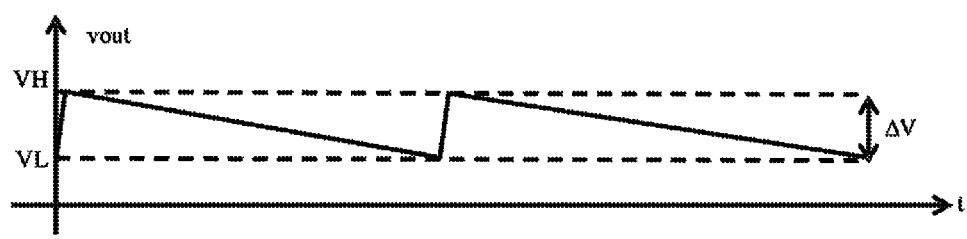
FIG. 4 illustrates a waveform diagram of a stable voltage $V_{out}$ when a charge pump voltage regulator operates in a standby mode consistent with the disclosed embodiments.

Further, referring to FIG. 3 and FIG. 4, where FIG. 4 illustrates a waveform diagram of the stable voltage $V_{out}$ when the charge pump voltage regulator operates in the standby mode, when the stable voltage $V_{out}$ is in a voltage range $\Delta V$ from the lower limit value $V_L$ to the upper limit value $V_H$, the output of the first voltage comparator circuit 204 may remain unchanged. Therefore, the logic control unit 205 may not be triggered, such that the drive clock signal CLK outputted from the clock oscillator 203 controlled by the logic control unit 205 may remain unchanged.

Thus, when the charge pump voltage regulator 200 operates in the standby mode and the stable voltage $V_{out}$ is in the voltage range $\Delta V$ from the lower limit value $V_L$ to the upper limit value $V_H$, the charge pump voltage regulator 200 may maintain the sleep state, such that the charge pump voltage regulator 200 may not be turned on frequently, to reduce the standby power consumption of the charge pump voltage regulator 200.

Figure 5:
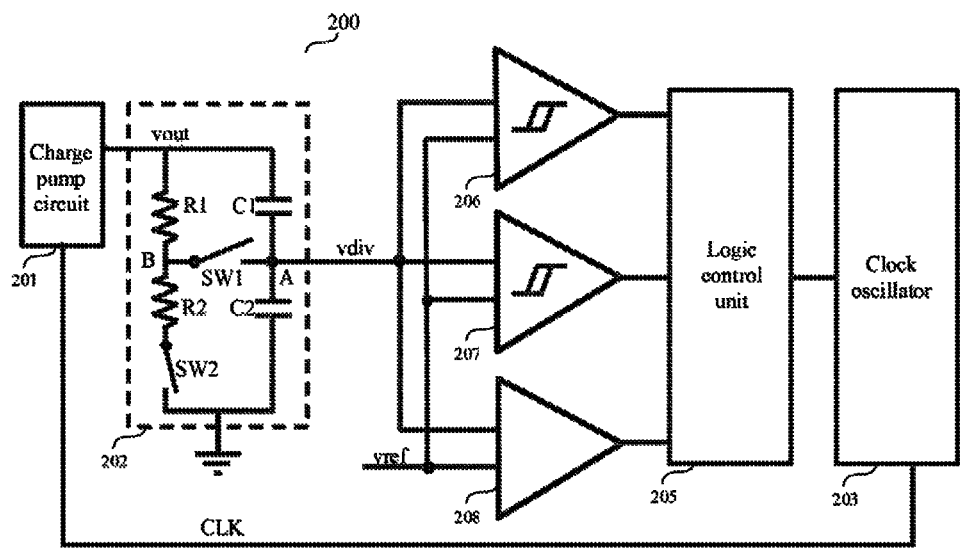
FIG. 5 illustrates a schematic diagram of another charge pump voltage regulator consistent with the disclosed embodiments.

FIG. 5 illustrates a schematic diagram of another charge pump voltage regulator consistent with the disclosed embodiments.

In one embodiment referring to FIG. 3 and FIG. 5, to make the comparison result outputted from the first voltage comparator circuit 204 not be reversed when the stable voltage $V_{out}$ outputted from the charge pump voltage regulator 200 is in the voltage range $\Delta V$ from the lower limit value $V_L$ to the upper limit value $V_H$, the first voltage comparator circuit 204 may include a first hysteresis voltage comparator 206. A first input terminal and a second input terminal of the first hysteresis voltage comparator 206 may be respectively connected to the first input terminal and the second input terminal of the first voltage comparator circuit 204, and may output the first comparison result (result 1).

The first voltage comparator circuit 204 may also include a second hysteresis voltage comparator 207. A first input terminal and a second input terminal of the second hysteresis voltage comparator 207 may be respectively connected to the first input terminal and the second input terminal of the first voltage comparator circuit 204, and may output the second comparison result (result 2).

The hysteresis voltage comparator may be a Schmitt trigger, and a threshold voltage of the hysteresis voltage comparator may include an upper threshold voltage and a lower threshold voltage. The threshold voltages of the first hysteresis voltage comparator 206 and the second hysteresis voltage comparator 207 can be determined according to the upper limit value $V_H$ and the lower limit value $V_L$. That is, after determining the required upper limit value $V_H$ and lower limit value $V_L$, the threshold voltages of the first hysteresis voltage comparator 206 and the second hysteresis voltage comparator 207 can be calculated and determined according to the required upper limit value $V_H$ and lower limit value $V_L$, thus selecting the appropriate device.

In one embodiment, when the stable voltage $V_{out}$ is smaller than the lower limit value $V_L$, the logic level of the first comparison result (result 1) may be reversed. When the stable voltage $V_{out}$ is larger than the upper limit value $V_H$, the logic level of the second comparison result (result 2) may be reversed.

In one embodiment, the charge pump voltage regulator 200 may also include a second voltage comparator 208. A first input terminal and a second input terminal of the second voltage comparator 208 may respectively input the reference voltage $V_{ref}$ and the divided voltage $V_{div}$. An output terminal of the second voltage comparator 208 may be suitable to output a third comparison result (result 3). When the charge pump voltage regulator 200 operates in the active mode, the logic control unit 205 may also be suitable to output a second control level (con 2) to the clock oscillator 203 according to the third comparison result (result 3).

In one embodiment, the voltage divider circuit 202 may include a capacitor voltage divider branch (not labeled), a resistor voltage divider branch (not labeled), and a first switch SW1 and a second switch SW2 capable of being simultaneously turned on or off.

A first input terminal and a second input terminal of the capacitor voltage divider branch may be respectively connected to the first input terminal and the second input terminal of the voltage divider circuit 202. The capacitor voltage divider branch may have a first voltage dividing node A, where the first voltage dividing node A may be connected to the output terminal of the voltage divider circuit 202. A first input terminal and a second input terminal of the resistor voltage-divider branch may be respectively connected to the first input terminal and the second input terminal of the voltage divider circuit 202. The resistor voltage-divider branch may have a second voltage dividing node B. A first terminal and a second terminal of the first switch SW1 may be respectively connected to the first voltage dividing node A and the second voltage dividing node B. A control terminal of the first switch SW1 may input a first switch control signal SWC1. The second switch SW2 may be connected in series to the resistor voltage divider branch, and a control terminal of the second switch SW2 may input a second switch control signal SWC2. The first switch control signal SWC1 and the second switch control signal SWC2 can be generated by the first comparison result (result 1) and/or the second comparison result (result 2). Specifically, the first switch control signal SWC1 and the second switch control signal SWC2 can be directly controlled by the level signal of the first comparison result (result 1) and/or the second comparison result (result 2); and can also be further generated by a logic operation or a delay circuit for the first comparison result (result 1) and/or the second comparison result (result 2).

In one embodiment, the capacitor voltage divider branch may include a first capacitor C1 and a second capacitor C2. A first terminal of the first capacitor C1 may be connected to the first input terminal of the capacitor voltage divider branch. A second terminal of the first capacitor C1 and a first terminal of the second capacitor C2 may be connected to the first voltage dividing node A. A second terminal of the second capacitor C2 may be connected to the second input terminal of the capacitor voltage divider branch.

In one embodiment, the resistor voltage divider branch may include a first resistor R1 and a second resistor R2. A first terminal of the first resistor R1 may be connected to the first input terminal of the resistor voltage divider branch. A second terminal of the first resistor R1 and a first terminal of the second resistor R2 may be connected to the second voltage dividing node B. A second terminal of the second resistor R2 may be connected to a first terminal of the first switch SW2. A second terminal of the second switch SW2 may be connected to the second input terminal of the resistor voltage divider branch.

In one embodiment, the first resistor R1 and the second resistance R2 can be a resistor, and can also be a transistor. Similarly, the first capacitor C1 and the second capacitor C2 can be a capacitor, and can also be a transistor. In one embodiment, the first switch SW1 and/or the second switch SW2 can be one or more of an NMOS transistor, a PMOS transistor, and a transmission gate.

Figure 6:
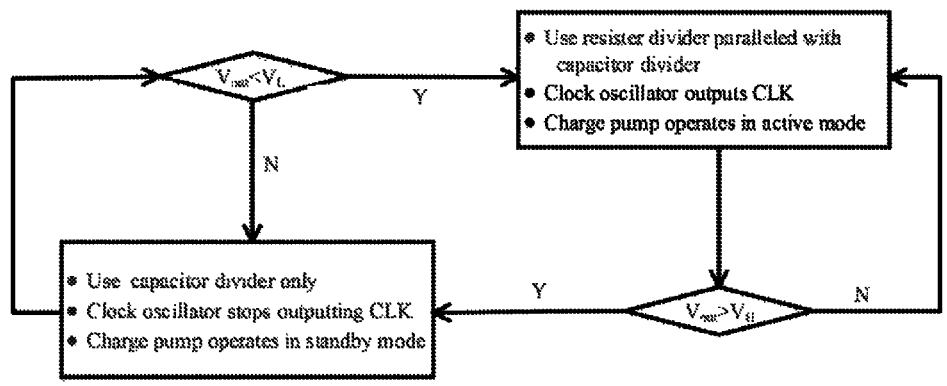
FIG. 6 illustrates an operation flow chart of a charge pump voltage regulator consistent with the disclosed embodiments.

Referring to FIG. 5 and FIG. 6, in one embodiment, if the charge pump voltage regulator 200 operates in the standby mode, when the stable voltage $V_{out}$ is larger than the upper limit value $V_H$, the logic level of the second comparison result (result 2) outputted from the second hysteresis voltage comparator 207 may be reversed and identified by the logic control unit 205. The logic control unit 205 may control the clock oscillator 203 to stop outputting the drive clock signal CLK, such that the stable voltage $V_{out}$ outputted from the charge pump circuit 201 may fall. At the same time, the logic control unit 205 can control the first switch SW1 and the second switch SW2 to be turned off, such that only the capacitor voltage divider branch in the voltage divider circuit 202 may divide the stable voltage $V_{out}$. Because the capacitor can sustain voltage without consuming the current, the standby power consumption of the charge pump voltage regulator 200 may be small in the standby mode. When the stable voltage $V_{out}$ is smaller than the lower limit value $V_L$, the logic level of the first comparison result (result 1) outputted from the first hysteresis voltage comparator 206 may be reversed and identified by the logic control unit 205. The logic control unit 205 may control the clock oscillator 203 to output the drive clock signal CLK, such that the stable voltage $V_{out}$ outputted from the charge pump circuit 201 may rise. At the same time, the logic control unit 205 can control the first switch SW1 and the second switch SW2 to be turned on, such that both the resistor voltage divider branch and the capacitor voltage divider branch in the voltage divider circuit 202 may divide the stable voltage $V_{out}$. Therefore the charge pump voltage regulator 200 can consume a certain amount of current in the active mode.

Accordingly, the charge pump voltage regulator consistent with the disclosed embodiments may include a charge pump circuit, a voltage divider circuit, a clock oscillator, a first voltage comparator circuit and a logic control unit. When the charge pump voltage regulator operates in the standby mode, and when the stable voltage is smaller than the lower limit value and the stable voltage is larger than the upper limit value, the first comparison result and/or the second comparison result outputted from the first voltage comparator circuit may be reversed. When the stable voltage is in the voltage range from the lower limit value to the upper limit value, the output of the first voltage comparator circuit may remain unchanged, the logic control unit may not be triggered, and the drive clock signal outputted from the clock oscillator controlled by the logic control unit may remain unchanged. Therefore when the charge pump voltage regulator operates in the standby mode, the charge pump voltage regulator may maintain the sleep state in the voltage range from the lower limit value to the upper limit value, such that the charge pump voltage regulator may not be turned on frequently, to reduce the standby power consumption of the charge pump voltage regulator.

Further, the voltage divider circuit consistent with the disclosed embodiments may include the capacitor voltage divider branch, the resistor voltage divider branch, and the first switch and the second switch capable of being simultaneously turned on or off. When the charge pump voltage regulator operates in the standby mode and the stable voltage is smaller than the lower limit value, the logic level of the first comparison result outputted from the first voltage comparator circuit may be reversed and be identified by the logic circuit. The logic control unit may control the clock oscillator to output the drive clock signal, such that the stable voltage outputted from the charge pump circuit may rise. At the same time, the logic control unit can control the first switch and the second switch to be turned on, such that both the resistor voltage divider branch and the capacitor voltage divider branch in the voltage divider circuit may divide the stable voltage. Therefore the charge pump voltage regulator can consume a certain amount of current in the active mode. When the stable voltage is larger than the upper limit value, the logic level of the second comparison result outputted from the second hysteresis voltage comparator may be reversed, such that the stable voltage outputted from the charge pump circuit may fall. At the same time, the logic control unit can control the first switch and the second switch to be turned off, such that only the capacitor voltage divider branch in the voltage divider circuit may divide the stable voltage. Because the capacitor can sustain voltage without consuming the current, the standby power consumption of the charge pump voltage regulator may be reduced in the present disclosure.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A charge pump voltage regulator, comprising:
    a charge pump circuit, wherein an output terminal of the charge pump circuit is connected to an output terminal of the charge pump voltage regulator and outputs a voltage;
    a voltage divider circuit to divide the voltage to output a divided voltage;
    a clock oscillator providing a drive clock signal for the charge pump circuit;
    a first voltage comparator circuit, wherein a first input terminal and a second input terminal of the first voltage comparator circuit respectively input a reference voltage and the divided voltage, and the first voltage comparator circuit outputs at least one of a first comparison result and a second comparison result, wherein the first voltage comparator circuit includes:
        a first hysteresis voltage comparator, wherein a first input terminal and a second input terminal of the first hysteresis voltage comparator are respectively connected to the first input terminal and the second input terminal of the first voltage comparator circuit, outputting a first comparison result; and
        a second hysteresis voltage comparator, wherein a first input terminal and a second input terminal of the second hysteresis voltage comparator are respectively connected to the first input terminal and the second input terminal of the first voltage comparator circuit, outputting a second comparison result; and
    a logic control unit, wherein, when the charge pump voltage regulator operates in a standby mode, the logic control unit outputs a first control level to the clock oscillator according to the at least one of the first comparison result and the second comparison result.

2. The charge pump voltage regulator according to claim 1, wherein:
    when the at least one of the first comparison result and the second comparison result indicate that the voltage is smaller than a lower limit value, the first control level outputted from the logic control unit controls the clock oscillator to output the drive clock signal;
    when the at least one of the first comparison result and the second comparison result indicate that the voltage is larger than an upper limit value, the first control level outputted from the logic control unit controls the clock oscillator to stop outputting the drive clock signal; and
    the lower limit value is smaller than the upper limit value.

3. The charge pump voltage regulator according to claim 1, wherein:
    a threshold voltage of the first hysteresis voltage comparator and the second hysteresis voltage comparator is determined according to the upper limit value and the lower limit value.

4. The charge pump voltage regulator according to claim 2, wherein:
    the voltage is smaller than the lower limit value; and
    a logic level of the first comparison result is reversed.

5. The charge pump voltage regulator according to claim 2, wherein:
    the voltage is larger than the upper limit value; and
    a logic level of the second comparison result is reversed.

6. The charge pump voltage regulator according to claim 1, further including:
    a second voltage comparator, wherein a first input terminal and a second input terminal of the second voltage comparator respectively input the reference voltage and the divided voltage, outputting a third comparison result;
    wherein, when the charge pump voltage regulator operates in an active mode, the logic control unit outputs a second control level to the clock oscillator according to the third comparison result.

7. The charge pump voltage regulator according to claim 1, wherein the voltage divider circuit includes:
    a capacitor voltage divider branch;
    a resistor voltage divider branch; and
    a first switch and a second switch capable of being simultaneously turned on or off,
    wherein a first input terminal and a second input terminal of the capacitor voltage divider branch are respectively connected to a first input terminal and a second input terminal of the voltage divider circuit;
    the capacitor voltage divider branch has a first voltage dividing node, and the first voltage dividing node is connected to an output terminal of the voltage divider circuit;

a first input terminal and a second input terminal of the resistor voltage divider branch are respectively connected to the first input terminal and the second input terminal of the voltage divider circuit;

the resistor voltage divider branch has a second voltage dividing node; a first terminal and a second terminal of the first switch are respectively connected to the first voltage dividing node and the second voltage dividing node;

a control terminal of the first switch inputs a first switch control signal; the second switch is connected in series to the resistor voltage divider branch;

a control terminal of the second switch inputs a second switch control signal; and the first switch control signal and the second switch control signal are generated by the first comparison result and/or the second comparison result.

8. The charge pump voltage regulator according to claim 7, wherein the capacitor voltage divider branch includes:

a first capacitor and a second capacitor, wherein a first terminal of the first capacitor is connected to the first input terminal of the capacitor voltage divider branch, a second terminal of the first capacitor and a first terminal of the second capacitor are connected to the first voltage dividing node, and a second terminal of the second capacitor is connected to the second input terminal of the capacitor voltage divider branch.

9. The charge pump voltage regulator according to claim 7, wherein the resistor voltage divider branch includes:

a first resistor and a second resistor, wherein a first terminal of the first resistor is connected to the input first terminal of the resistor voltage divider branch, a second terminal of the first resistor and a first terminal of the second resistor are connected to the second voltage dividing node, a second terminal of the second resistor is connected to a first terminal of the second switch, and a second terminal of the second switch is connected to the second input terminal of the resistor voltage divider branch.

10. The charge pump voltage regulator according to claim 7, wherein:

the first switch is a transmission gate.

11. The charge pump voltage regulator according to claim 7, wherein:

the second switch is an NMOS transistor.

12. A method for driving a charge pump voltage regulator, comprising:

providing a charge pump circuit, wherein an output terminal of the charge pump circuit is connected to an output terminal of the charge pump voltage regulator and outputs a voltage;

providing a voltage divider circuit to divide the voltage to output a divided voltage;

providing a clock oscillator providing a drive clock signal for the charge pump circuit;

providing a first voltage comparator circuit, wherein a first input terminal and a second input terminal of the first voltage comparator circuit respectively input a reference voltage and the divided voltage, and the first voltage comparator circuit outputs at least one of a first comparison result and a second comparison result, wherein the first voltage comparator circuit includes:

a first hysteresis voltage comparator, wherein a first input terminal and a second input terminal of the first hysteresis voltage comparator are respectively connected to the first input terminal and the second input terminal of the first voltage comparator circuit, outputting a first comparison result; and a second hysteresis voltage comparator, wherein a first input terminal and a second input terminal of the second hysteresis voltage comparator are respectively connected to the first input terminal and the second input terminal of the first voltage comparator circuit, outputting a second comparison result; and providing a logic control unit, wherein, when the charge pump voltage regulator operates in a standby mode, the logic control unit outputs a first control level to the clock oscillator according to the at least one of the first comparison result and the second comparison result.

13. The method according to claim 12, wherein:

at least one of the first comparison result and the second comparison result is reversed when the charge pump voltage regulator operates in a standby mode, and the voltage is smaller than a lower limit value or larger than an upper limit value; and at least one of the first comparison result and the second comparison result remains unchanged when the voltage is in a voltage range from the lower limit value to the upper limit value.

14. The method according to claim 13, wherein, when at least one of the first comparison result and the second comparison result remains unchanged:

the logic control unit is not triggered; and the drive clock signal outputted from the clock oscillator controlled by the logic control unit remains unchanged.

15. The method according to claim 12, wherein forming the voltage divider circuit includes:

providing a capacitor voltage divider branch;

providing a resistor voltage divider branch; and providing a first switch and a second switch capable of being simultaneously turned on or off;

wherein a first input terminal and a second input terminal of the capacitor voltage divider branch are respectively connected to a first input terminal and a second input terminal of the voltage divider circuit;

the capacitor voltage divider branch has a first voltage dividing node, and the first voltage dividing node is connected to an output terminal of the voltage divider circuit;

a first input terminal and a second input terminal of the resistor voltage divider branch are respectively connected to the first input terminal and the second input terminal of the voltage divider circuit;

the resistor voltage divider branch has a second voltage dividing node; a first terminal and a second terminal of the first switch are respectively connected to the first voltage dividing node and the second voltage dividing node;

a control terminal of the first switch inputs a first switch control signal; the second switch is connected in series to the resistor voltage divider branch;

a control terminal of the second switch inputs a second switch control signal; and the first switch control signal and the second switch control signal are generated by the first comparison result and/or the second comparison result.

16. The method according to claim 15, wherein forming the capacitor voltage divider branch includes:

providing a first capacitor; and providing a second capacitor;

wherein a first terminal of the first capacitor is connected to the first input terminal of the capacitor voltage divider branch, a second terminal of the first capacitor and a first terminal of the second capacitor are connected to the first voltage dividing node, and a second terminal of the second capacitor is connected to the second input terminal of the capacitor voltage divider branch.

17. The method according to claim 15, wherein forming the resistor voltage divider branch includes:
   providing a first resistor; and
   providing a second resistor;
   wherein a first terminal of the first resistor is connected to the input first terminal of the resistor voltage divider branch, a second terminal of the first resistor and a first terminal of the second resistor are connected to the second voltage dividing node, a second terminal of the second resistor is connected to a first terminal of the second switch, and a second terminal of the second switch is connected to the second input terminal of the resistor voltage divider branch.

18. The method according to claim 15, wherein, when the charge pump voltage regulator operates in the standby mode and the voltage is smaller than the lower limit value:
   the logic level of the first comparison result outputted from the first voltage comparator circuit is reversed and identified by the logic circuit;
   the logic control unit controls the clock oscillator to output the drive clock signal, such that the voltage outputted from the charge pump circuit rises; and
   the logic control unit also controls the first switch and the second switch to be turned on, such that both the resistor voltage divider branch and the capacitor voltage divider branch in the voltage divider circuit divide the voltage.

19. The method according to claim 15, wherein, when the voltage is larger than the upper limit value:
   the logic level of the second comparison result outputted from the first voltage comparator circuit is reversed and identified by the logic circuit;
   the logic control unit controls the clock oscillator to stop outputting the drive clock signal, such that the voltage outputted from the charge pump circuit falls; and
   the logic control unit also controls the first switch and the second switch to be turned off, such that only the capacitor voltage divider branch in the voltage divider circuit divides the voltage.

\* \* \* \* \*